(12) United States Patent
Yu et al.

(10) Patent No.: US 11,319,210 B2
(45) Date of Patent: May 3, 2022

(54) STRETCHABLE FILM STRUCTURE AND METHOD OF MAKING THE SAME

(71) Applicants: Tsinghua University, Beijing (CN); HON HAI PRECISION INDUSTRY CO., LTD., New Taipei (TW)

(72) Inventors: Yang Yu, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 461 days.

(21) Appl. No.: 16/379,287

(22) Filed: Apr. 9, 2019

(65) Prior Publication Data

US 2020/0002170 A1 Jan. 2, 2020

(30) Foreign Application Priority Data

Jun. 29, 2018 (CN) .......................... 201810712021.4

(51) Int. Cl.
*B32B 9/00* (2006.01)
*C01B 32/16* (2017.01)
*B82Y 30/00* (2011.01)

(52) U.S. Cl.
CPC .............. *C01B 32/16* (2017.08); *B82Y 30/00* (2013.01); *C01B 2202/08* (2013.01); *C01B 2202/26* (2013.01); *Y10T 428/30* (2015.01)

(58) Field of Classification Search
CPC ....... Y10T 428/30; B82Y 30/00; B82Y 40/00; B32B 9/007; H01B 1/04; C01B 32/06; C01B 2202/08
USPC ........................................ 428/408; 423/447.1
See application file for complete search history.

(56) References Cited

U.S. PATENT DOCUMENTS

| 8,288,723 | B2* | 10/2012 | Zhang | ..................... | H01J 37/20 250/311 |
|---|---|---|---|---|---|
| 2008/0299460 | A1 | 12/2008 | Feng et al. | | |
| 2010/0047522 | A1 | 2/2010 | Sivarajan et al. | | |
| 2011/0096465 | A1 | 4/2011 | Zhou et al. | | |
| 2011/0097512 | A1 | 4/2011 | Zhou et al. | | |
| 2011/0108545 | A1 | 5/2011 | Wang et al. | | |
| 2011/0256451 | A1 | 10/2011 | Cui et al. | | |

(Continued)

FOREIGN PATENT DOCUMENTS

| CN | 1357899 | 7/2002 |
|---|---|---|
| CN | 101315974 | 12/2008 |

(Continued)

*Primary Examiner* — Daniel H Miller
(74) *Attorney, Agent, or Firm* — ScienBiziP, P.C.

(57) ABSTRACT

A method of making a stretchable film structure is provided. An elastic substrate is pre-stretched in a first direction and a second direction to obtain a pre-stretched elastic substrate. A carbon nanotube film structure is laid on a surface of the pre-stretched elastic substrate. The carbon nanotube film structure comprises a plurality of super-aligned carbon nanotube films stacked with each other. The pre-stretching the elastic substrate is removed and a plurality of wrinkles is formed on a surface of the carbon nanotube film structure to form the stretchable film structure. The present disclosure also relates to the stretchable film structure obtained by the above method.

16 Claims, 10 Drawing Sheets providing an elastic substrate, and pre-stretching the elastic substrate in a first direction and a second direction intersecting with the first direction, to obtain a pre-stretched elastic substrate ⟶ S1 laying a carbon nanotube film structure on a surface of the pre-stretched elastic substrate, and the carbon nanotube film structure comprising a plurality of super-aligned carbon nanotube films stacked with each other, each of the plurality of super-aligned carbon nanotube films comprising a plurality of carbon nanotubes substantially extending in the same direction ⟶ S2 removing the pre-stretching of the elastic substrate and forming a plurality of wrinkles on a surface of the carbon nanotube film structure to form the stretchable film structure ⟶ S3

(56) References Cited

U.S. PATENT DOCUMENTS

| | | |
|---|---|---|
| 2013/0045413 A1 | 2/2013 | Wang et al. |
| 2013/0146215 A1 | 6/2013 | Liu et al. |
| 2013/0284695 A1 | 10/2013 | Feng et al. |
| 2014/0175087 A1 | 6/2014 | Feng et al. |
| 2015/0207143 A1 | 7/2015 | Wu et al. |
| 2018/0026258 A1 | 1/2018 | Yan et al. |

FOREIGN PATENT DOCUMENTS

| | | |
|---|---|---|
| CN | 102103935 | 6/2011 |
| CN | 103159204 | 6/2013 |
| CN | 103903870 | 7/2014 |
| CN | 104538202 | 4/2015 |
| CN | 107565091 | 1/2018 |
| CN | 107611468 | 1/2018 |
| CN | 107644977 | 1/2018 |
| CN | 107747957 | 3/2018 |
| CN | 108155387 | 6/2018 |
| JP | 2011-088813 | 5/2011 |
| JP | 2011-103293 | 5/2011 |
| JP | 2015-138777 | 7/2015 |
| TW | 201343950 | 11/2013 |

\* cited by examiner providing an elastic substrate, and pre-stretching the elastic substrate in a first direction and a second direction intersecting with the first direction, to obtain a pre-stretched elastic substrate ~ S1 laying a carbon nanotube film structure on a surface of the pre-stretched elastic substrate, and the carbon nanotube film structure comprising a plurality of super-aligned carbon nanotube films stacked with each other, each of the plurality of super-aligned carbon nanotube films comprising a plurality of carbon nanotubes substantially extending in the same direction ~ S2 removing the pre-stretching of the elastic substrate and forming a plurality of wrinkles on a surface of the carbon nanotube film structure to form the stretchable film structure ~ S3

STRETCHABLE FILM STRUCTURE AND METHOD OF MAKING THE SAME

CROSS-REFERENCE TO RELATED APPLICATIONS

This application claims all benefits accruing under 35 U.S.C. § 119 from China Patent Application No. 201810712021.4, filed on Jun. 29, 2018, in the China National Intellectual Property Administration, the contents of which are hereby incorporated by reference. The application is also related to copending applications entitled, "METHOD FOR MAKING STRETCHABLE CAPACITOR ELECTRODE-CONDUCTOR STRUCTURE", filed Apr. 9, 2019, Ser. No. 16/379,258. The application is also related to copending applications entitled, "STRETCHABLE CAPACITOR ELECTRODE-CONDUCTOR STRUCTURE", filed Apr. 9, 2019, Ser. No. 16/379,264. The application is also related to copending applications entitled, "STRETCHABLE COMPOSITE ELECTRODE AND STRETCHABLE LITHIUM ION BATTERY USING THE SAME", filed Apr. 9, 2019, Ser. No. 16/379,258. The application is also related to copending applications entitled, "METHOD OF MAKING STRETCHABLE COMPOSITE ELECTRODE", filed Apr. 9, 2019, Ser. No. 16/379,258.

FIELD

The present disclosure relates to stretchable film structures and a method of making the same.

BACKGROUND

Stretchable film structures can be applied to many fields, such as, stretchable energy-storage devices and flexible touch screens. Carbon nanotube film structures have excellent flexibility, and the carbon nanotube film structures are commonly used as stretchable film structures.

However, conventional carbon nanotube film structures is stretchable under little stress in a single direction, and can be easily broken when it is repeatedly stretched in different directions at the same time.

Therefore, there is a room for improvement.

BRIEF DESCRIPTION OF THE DRAWINGS

Implementations of the present technology will now be described, by way of embodiments, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 1:
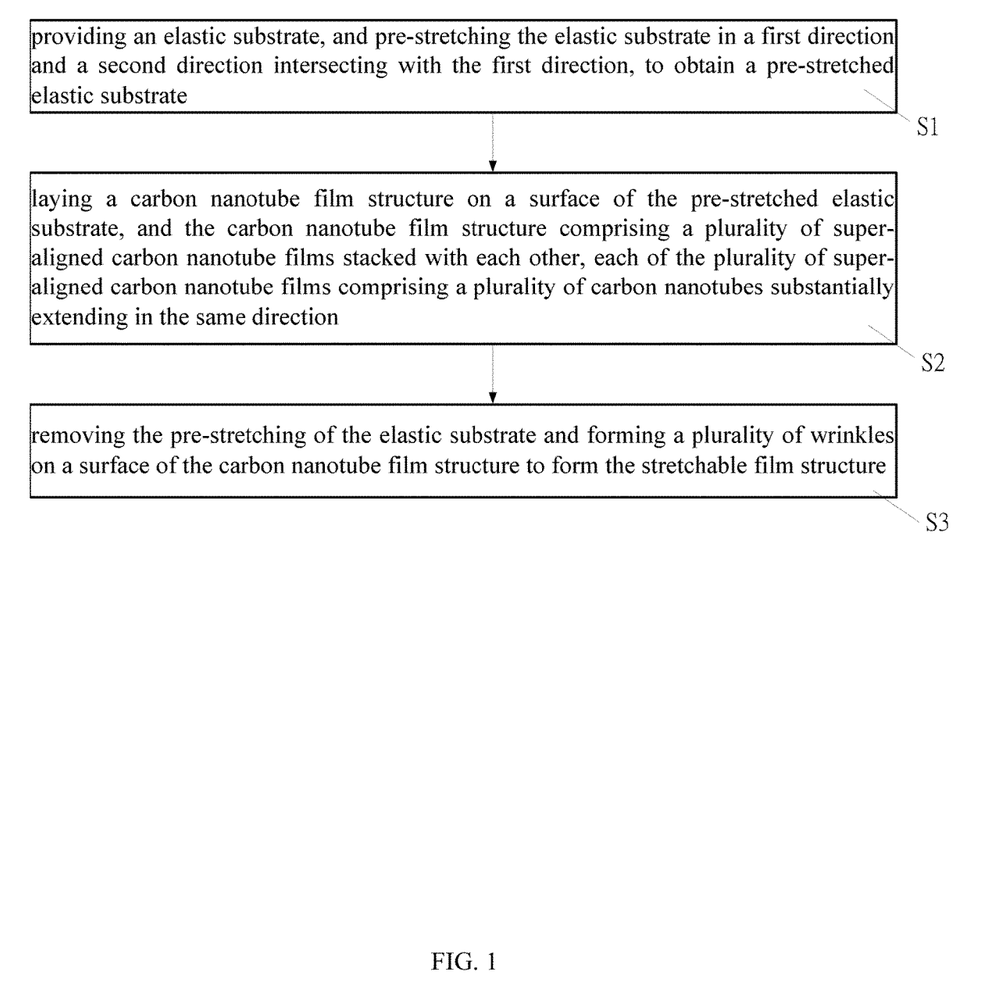
FIG. 1 is a flow diagram of one embodiment of a method of making a stretchable film structure.
Figure 2:
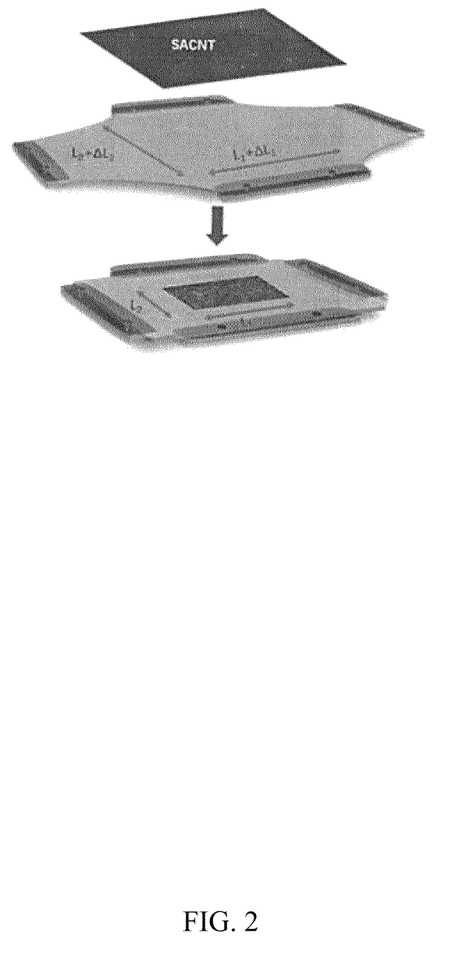
FIG. 2 is a schematic view of the method of making the stretchable film structure in FIG. 1.

FIG. 1 and FIG. 2 show one embodiment of the present application in relation to a method of making a stretchable film structure. The method comprises:

step (S1), providing an elastic substrate, and pre-stretching the elastic substrate along a first direction and a second direction intersecting with the first direction, to obtain a pre-stretched elastic substrate;

step (S2), laying a carbon nanotube film structure on a surface of the pre-stretched elastic substrate, and the carbon nanotube film structure directly contacting with the pre-stretched elastic substrate and comprising a plurality of super-aligned carbon nanotube films stacked with each other, each of the plurality of super-aligned carbon nanotube films comprising a plurality of carbon nanotubes substantially parallel with each other; and step (S3), releasing the pre-stretching of the elastic substrate to restore deformations of the elastic substrate, and forming a plurality of wrinkles on a surface of the carbon nanotube film structure to form the stretchable film structure.

In step (S1), an intersection angle of the first direction and the second direction is not limited. In one embodiment, the first direction is perpendicular with the second direction. When the first direction being perpendicular with the second direction, the elastic substrate can be evenly stretched during pre-stretching; and after the pre-stretching is released, the distribution, size, and shape of the plurality of wrinkles are uniform. Therefore, when the stretchable film structure is stretched in any direction, the plurality of wrinkles can be unfolded in a stress direction, and thus an ability of the stretchable film structure to resist stretching in different directions is improved.

In some embodiments, the elastic substrate is pre-stretched in three or more directions to make the elastic substrate be in a tensional state, and the three or more directions are symmetrical and intersecting.

A material of the elastic substrate can be selected from silicone rubber, polyvinyl chloride, polytetrafluoroethylene, polyurethane (PU), polyvinyl chloride (PVC), polydimethylsiloxane (PDMS) and the like. In one embodiment, the elastic substrate is a rectangular PDMS substrate.

In one embodiment, the elastic substrate is biaxial pre-stretched in each of the first direction the second direction. "Biaxial pre-stretched" refers that the elastic substrate is pre-stretched toward two ends in each of the first direction and the second direction. In one embodiment, the elastic substrate is uniaxial pre-stretched in the first direction and the second direction. "Uniaxial pre-stretched" refers that in each of the first direction and the second direction, one end of the elastic substrate is fixed, and only the other end is pre-stretched. In one embodiment, a shape of the elastic substrate is a rectangle, the elastic substrate is biaxial pre-stretched both in the first direction and the second direction, the first direction is parallel to a long side of the rectangle, and the second direction is parallel to a short side of the rectangle.

In one embodiment, a first pre-stretching capacity of the elastic substrate in the first direction is the same as a second pre-stretching capacity of the elastic substrate in the second direction. The first pre-stretching capacity refers a percentage of a length of the elastic substrate in the first direction after pre-stretching and a length of the elastic substrate in the first direction before pre-stretching. The second pre-stretching capacity refers a percentage of a length of the elastic substrate in the second direction after pre-stretching and a length of the elastic substrate in the second direction before pre-stretching.

In one embodiment, the first pre-stretching capacity of the elastic substrate in the first direction is different from the second pre-stretching capacity of the elastic substrate in the second direction.

The pre-stretching capacity of the elastic substrate needs to be controlled within an elastic range of the elastic substrate. The pre-stretching capacity of the elastic substrate can be selected according to the material of the elastic substrate and actual needs. In one embodiment, each of the first pre-stretching capacity and the second pre-stretching capacity is 150%. Pre-stretching the elastic substrate by applying an external force to the elastic substrate in both the first direction and the second direction, the external force causes the elastic substrate to be elastically deformed without being damaged. In one embodiment, pre-stretching the elastic substrate by a clamp.

In step (S2), in one embodiment, the plurality of carbon nanotubes are differently aligned between adjacent two of the super-aligned carbon nanotube films to form a grid structure, and alignment directions of the plurality of carbon nanotubes between adjacent two of the super-aligned carbon nanotube films intersect with each other/are different. A angle of the alignment directions of the plurality of carbon nanotubes between adjacent two of the super-aligned carbon nanotube films is not limited. In one embodiment, the angle of the alignment directions of the plurality of carbon nanotubes between adjacent two of the super-aligned carbon nanotube films is about 90 degrees.

Each of the plurality of super-aligned carbon nanotube films can be drawn from a super-aligned carbon nanotube array. A method of drawing the super-aligned carbon nanotube film from the super-aligned carbon nanotube array comprises step (a) of selecting carbon nanotube segments with a certain width from the super-aligned carbon nanotube array and, at a certain speed, and step (b) of stretching the carbon nanotube segments to be substantially perpendicular to a growth direction of the super-aligned carbon nanotube array. Thus, the super-aligned carbon nanotube film is obtained. The super-aligned carbon nanotube array comprises a plurality of carbon nanotubes, the plurality of carbon nanotubes are substantially parallel to each other and perpendicular to a surface of a substrate. The super-aligned carbon nanotube array is pure, referring that the super-aligned carbon nanotube array is free with impurities, such as amorphous carbon, residual catalyst metal particles or the like. Examples of the method of making the super-aligned carbon nanotube array are taught by U.S. Pat. No. 7,045,108 to Jiang et al. The plurality of carbon nanotubes of the super-aligned carbon nanotube film joined end to end by van der Waals forces and extend in the same direction. An arranged direction of the plurality of carbon nanotubes of the super-aligned carbon nanotube film is substantially parallel to a drawing direction of the super-aligned carbon nanotube film.

Figure 3:
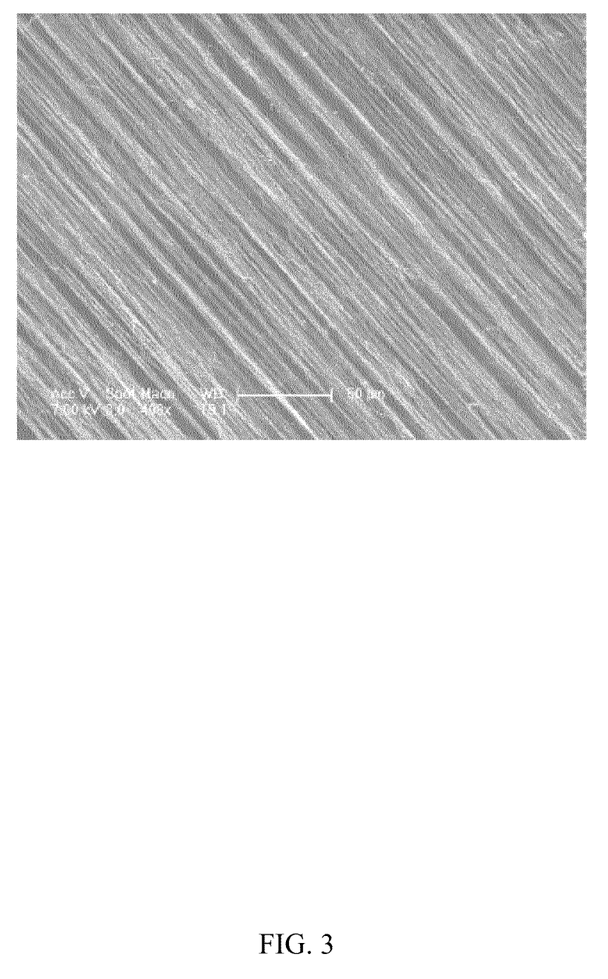
FIG. 3 is a scanning electron microscope image of one embodiment of a super-aligned carbon nanotube film.

FIG. 3 illustrates the super-aligned carbon nanotube film includes a number of carbon nanotubes that are arranged substantially parallel to a surface of the super-aligned carbon nanotube film. A large number of the carbon nanotubes of the super-aligned carbon nanotube film can be oriented along a preferred orientation, meaning that a large number of the carbon nanotubes in the super-aligned carbon nanotube film are arranged substantially along the same direction. An end of one carbon nanotube is joined to another end of an adjacent carbon nanotube arranged substantially along the same direction, by van der Waals force, to form a free-standing film.

A minority of carbon nanotubes in the super-aligned carbon nanotube film may be randomly aligned. However, the number of randomly aligned carbon nanotubes is very small and does not affect the overall oriented alignment of the majority of carbon nanotubes in the super-aligned carbon nanotube film. The majority of the carbon nanotubes in the super-aligned carbon nanotube film substantially aligned along the same direction may not be exactly straight, and can be curved to a certain degree, or are not exactly aligned along the overall aligned direction, and can deviate from the overall aligned direction by a certain degree. Therefore, partial contacts can exist between the randomly aligned carbon nanotubes and adjacent carbon nanotubes.

In one embodiment, the super-aligned carbon nanotube film is directly laid on the surface of the pre-stretched elastic substrate after drawn from the carbon nanotube array. The method of laying the carbon nanotube film structure on the surface of the pre-stretched elastic substrate comprises: drawing a first carbon nanotube film from a carbon nanotube array and laying the first carbon nanotube film on the surface of the pre-stretched elastic substrate; drawing a second carbon nanotube film from the carbon nanotube array and laying the second carbon nanotube film on a surface of the first carbon nanotube film, to make the second carbon nanotube film stack with the first carbon nanotube film; and repeating above steps to a predetermined thickness of the carbon nanotube film structure.

In one embodiment, the plurality of super-aligned carbon nanotube films are stacked with each other to form the carbon nanotube film structure before laying on the surface of the pre-stretched elastic substrate. In one embodiment, laying six-layer stacked super-aligned carbon nanotube films on an aluminum frame of 75 mm×75 mm to form a carbon nanotube film structure, and adjacent super-aligned carbon nanotube films cross each other; and then removing the carbon nanotube film structure from the aluminum frame and laying the carbon nanotube film structure on the surface of the pre-stretched elastic substrate.

A first angle between the extending direction of the carbon nanotubes of the carbon nanotube film structure and the first direction is not limited; a second angle between the extending direction of the carbon nanotubes of the carbon nanotube film structure and the second direction is not limited. In one embodiment, the extending direction of the carbon nanotubes of the carbon nanotube film structure is parallel with the first direction or the second direction.

The number of the super-aligned carbon nanotube films of the carbon nanotube film structure is not limited. In one embodiment, the carbon nanotube film structure consists of six super-aligned carbon nanotube films stacked with each other.

The carbon nanotube film structure is pure and substantially free of impurities, and thus the carbon nanotube film structure has a large viscosity and can be fixed to the surface of the elastic substrate by its own viscosity.

In another embodiment, an organic solvent can be applied on the carbon nanotube film structure to soak the carbon nanotube film structure, after step (S2) and before step (S3). The organic solvent can be dropped onto the carbon nanotube film structure. After being soaked by the organic solvent, the adjacent paralleled carbon nanotubes in the carbon nanotube film structure will bundle together, due to the surface tension of the organic solvent as the organic solvent volatilizes. The carbon nanotubes in the carbon nanotube film structure can combine tightly via van der Waals attractive force. The carbon nanotube film structure can also combine with the elastic substrate tightly after being soaked by the organic solvent. The organic solvent can be volatile, such as ethanol, methanol, acetone, dichloromethane, chloroform, or any appropriate mixture thereof. When the carbon nanotube film structure is soaked by the organic solvent, step (S3) is performed after the organic solvent is evaporated to the absence of significant droplets.

In step (S3), since the carbon nanotube film structure is bonded to the surface of the elastic substrate, after releasing the pre-stretching of the elastic substrate, a length of the elastic substrate in the first direction and a length of the elastic substrate in the second direction are shortened, and the elastic substrate returns to an original form before the pre-stretching. The plurality of carbon nanotubes of the carbon nanotube film structure bend along a direction substantially perpendicular to the surface of the elastic substrate and form a number of wave shaped protuberances. Namely, some portions of the carbon nanotubes are higher than other portions of the carbon nanotubes.

Figure 4:
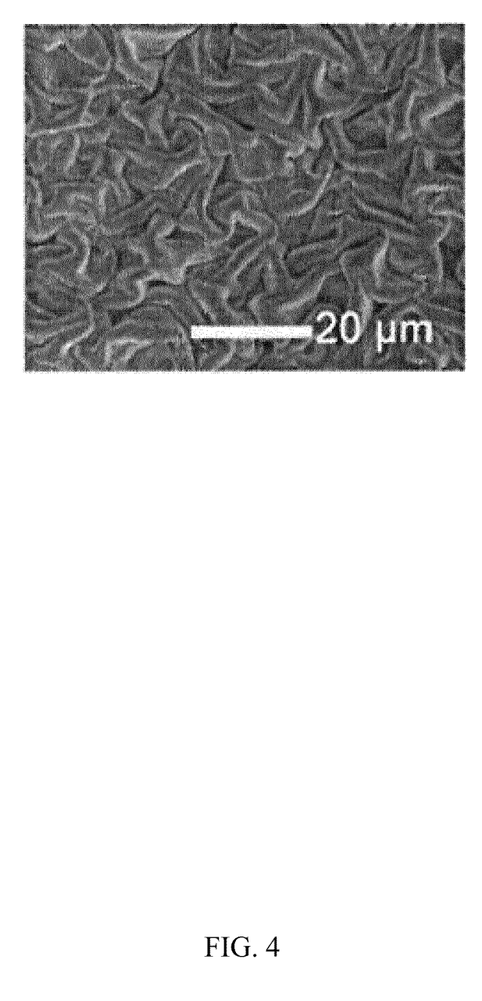
FIG. 4 is a surface morphology of a carbon nanotube film structure after pre-stretching.

Referring to FIG. 4, the carbon nanotube film structure includes a plurality of wrinkles formed by the wave shaped protuberances. When the stretchable film structure is stretched in one direction or simultaneously stretched in different directions, the plurality of wrinkles can be unfolded in the stress direction; the carbon nanotubes of the carbon nanotube film structure are not broken, and the integrity of the carbon nanotube film structure is maintained. If the stress is less than or equal to the pre-stretching capacity of the elastic substrate, the deformation of the plurality of wrinkles is reversible, and thus the stretchable film structure can be reused.

In one embodiment, further comprising a step of removing the elastic substrate after step (S3).

Figure 5:
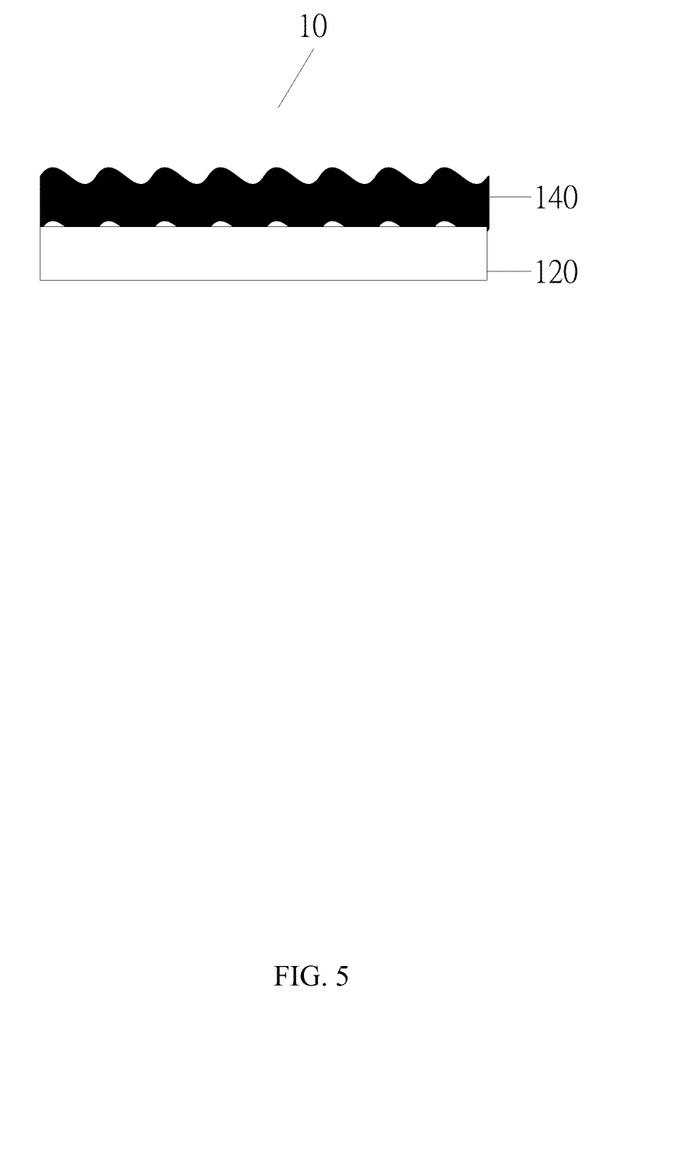
FIG. 5 is a side view of one embodiment of a stretchable film structure.

FIG. 5 shows one embodiment of the present application in relation to a stretchable film structure 10 obtaining by the above method. The stretchable film structure 10 comprises an elastic substrate 120 and a carbon nanotube film structure 140. The carbon nanotube film structure 140 is laying on a surface of the elastic substrate 120. The carbon nanotube film structure 140 comprises a plurality of super-aligned carbon nanotube films stacked with each other. Each of the plurality of super-aligned carbon nanotube films comprises a plurality of carbon nanotubes. The plurality of carbon nanotubes is joined end to end by van der Waals forces and parallels with each other. A surface of the carbon nanotube film structure 140 comprises a plurality of wrinkles. When the stretchable film structure 10 is stretched in one direction or simultaneously stretched in many different directions, the plurality of wrinkles can be unfolded in a stress direction; the carbon nanotubes of the carbon nanotube film structure 140 are not broken, and the integrity of the carbon nanotube film structure 140 is maintained.

In one embodiment, the plurality of carbon nanotubes are differently aligned between adjacent two of the super-aligned carbon nanotube films to form a grid structure, and alignment directions of the plurality of carbon nanotubes between adjacent two of the super-aligned carbon nanotube films intersect with each other/are different. A angle of the alignment directions of the plurality of carbon nanotubes between adjacent two of the super-aligned carbon nanotube films is not limited. In one embodiment, the angle of the alignment directions of the plurality of carbon nanotubes between adjacent two of the super-aligned carbon nanotube films is about 90 degrees.

Figure 6:
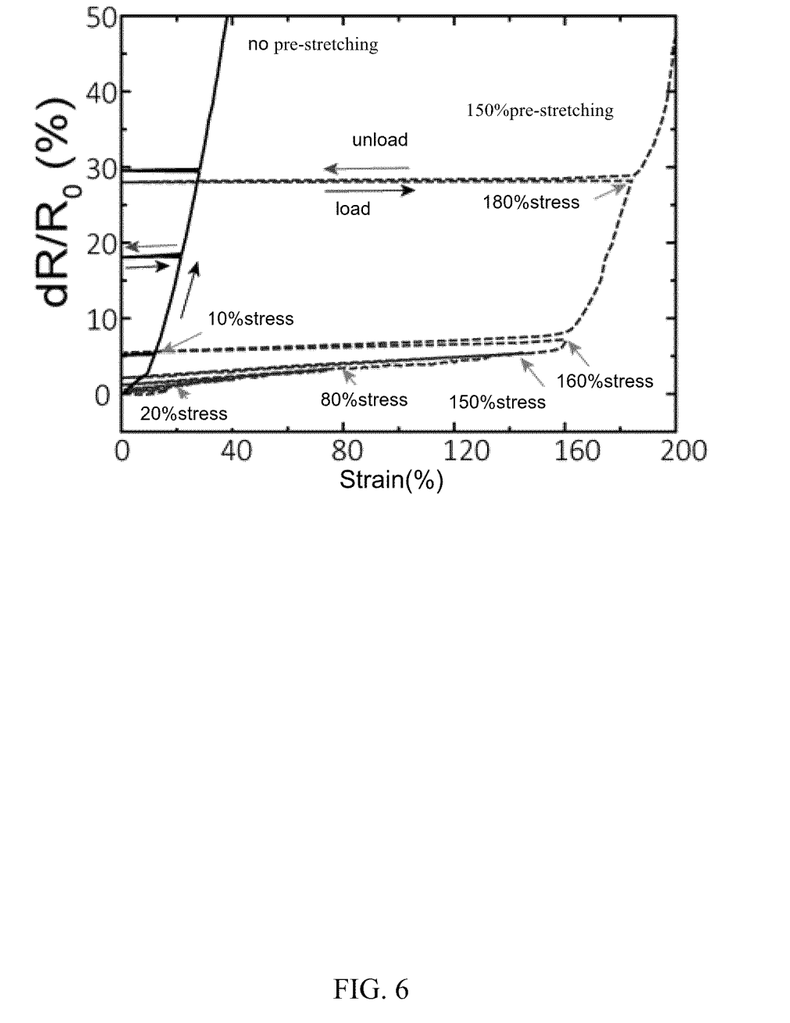
FIG. 6 is a diagram of a resistance of the stretchable film structure in FIG. 5 vs strain at difference stress conditions.

FIG. 6 shows changes in a resistance of the stretchable film structure 10 with changing the stress, the first pre-stretching capacity and the second pre-stretching capacity of the elastic substrate during making the stretchable film structure are both 150%. When the stress is 20% and 80%, the resistance of the stretchable film structure 10 changes little with changing temperature, and after the stress is unloaded, the resistance increases irreversibly by 0.7% when the stress is 20%, and the resistance increases irreversibly by 1.2% when the stress is 80%. When the stress is 150%, the resistance of the stretchable film structure increases by 5%, and, the resistance increases irreversibly by 2% after the stress is unloaded. When the stress is 160%, the resistance increases irreversibly by 6% after the stress is unloaded. However, when the stress is 190%, the resistance increases irreversibly by 32.2% after the stress is unloaded. It can be seen that when the stress applied to the stretchable film structure is less than the pre-stretching capacity of the elastic substrate, the resistance of the stretchable film structure changes little with increasing the stress, the stress does not cause irreversible damage to a conductive network in the stretchable film structure and the resistance is almost completely reversible; which indicates that a deformation of the stretchable film structure is reversible when the stress applied to the stretchable film structure is less than the pre-stretching capacity of the elastic substrate. It can also be seen that when the stress applied to the stretchable film structure is larger than the pre-stretching amount, the resistance of the stretchable film structure rapidly increases irreversibly with increasing the stress. It can further be seen that the resistance stability of the stretchable film structure is significantly better than that of the film structure without pre-stretching, which indicates that a tensile strength of the stretchable film structure is significantly better than that of the film structure without pre-stretching.

Figure 7:
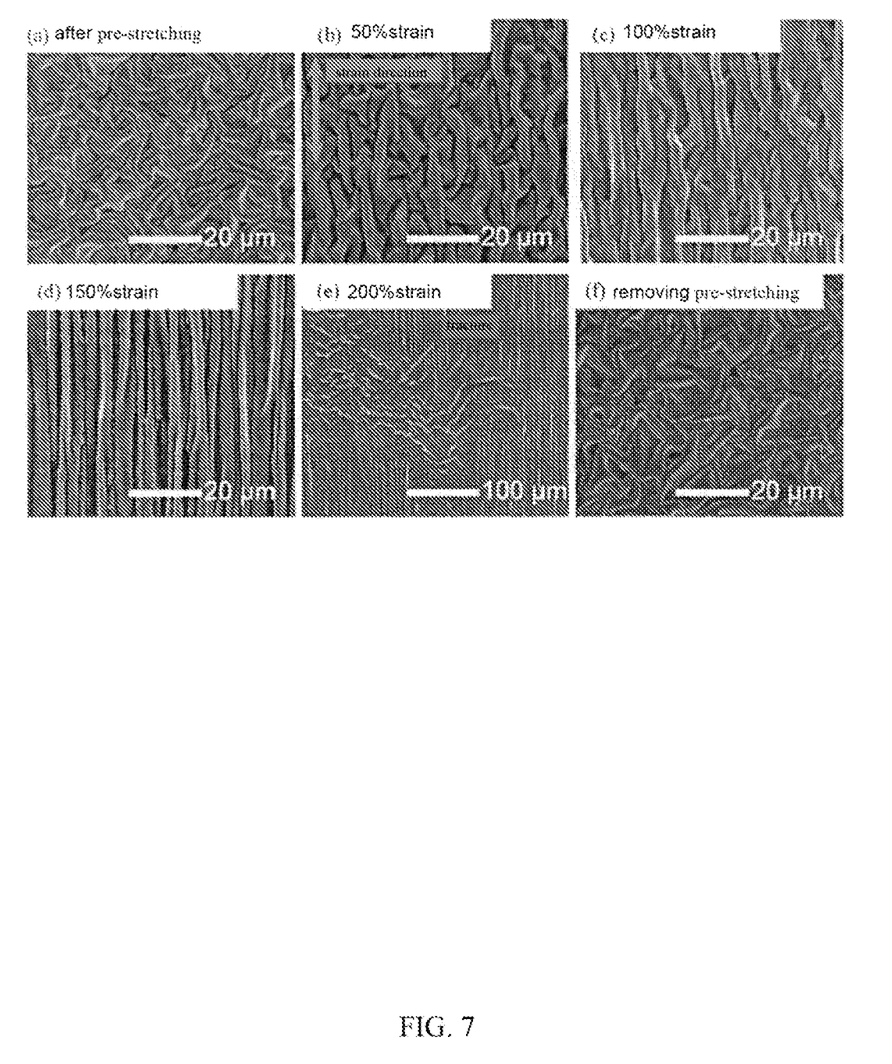
FIG. 7 is a surface morphology of one embodiment of a carbon nanotube film structure when loaded with different stresses.

In one embodiment, the first pre-stretching capacity of the elastic substrate and the second pre-stretching capacity of the elastic substrate of the elastic substrate during making the stretchable film structure are both 150%. Referring to FIG. 7, when the stress applied to the stretchable film structure is 50%, 100% or 150%, the wrinkles on the surface of the stretchable film structure are unfolded in the stress direction, the carbon nanotubes in the carbon nanotube structure are not broken, and the integrity of the carbon nanotube film structure is maintained. When the stress applied to the stretchable film structure exceeds the pre-stretching capacity, a portion of the carbon nanotube film structure is broken. However, when the stress is unloaded, a surface morphology of the carbon nanotube film structure is substantially the same as the original surface morphology of the carbon nanotube film structure. It is shown that the deformation of the wrinkles on the surface of the stretchable film structure is reversible.

Figure 8:
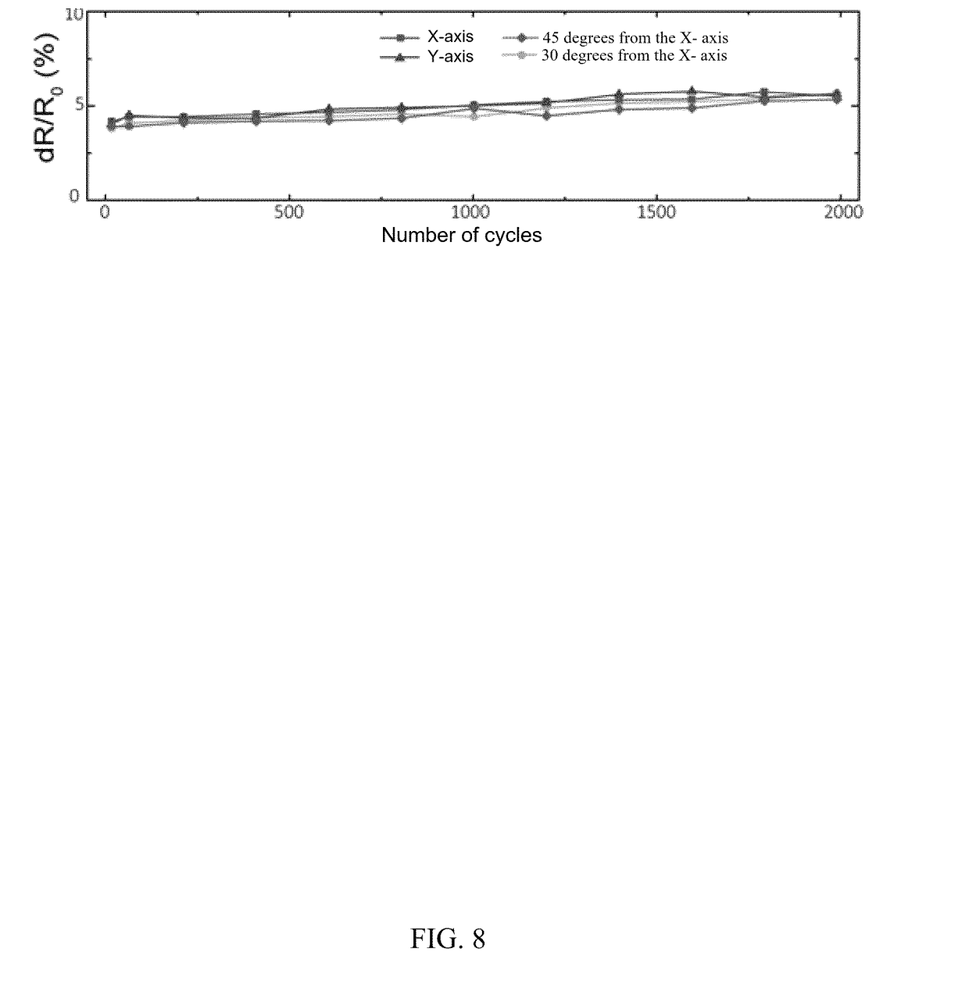
FIG. 8 is a diagram of an axial resistance increase of the stretchable film structure in FIG. 5 vs the number of 0-150 stress cycles at different stretching directions.
Figure 9:
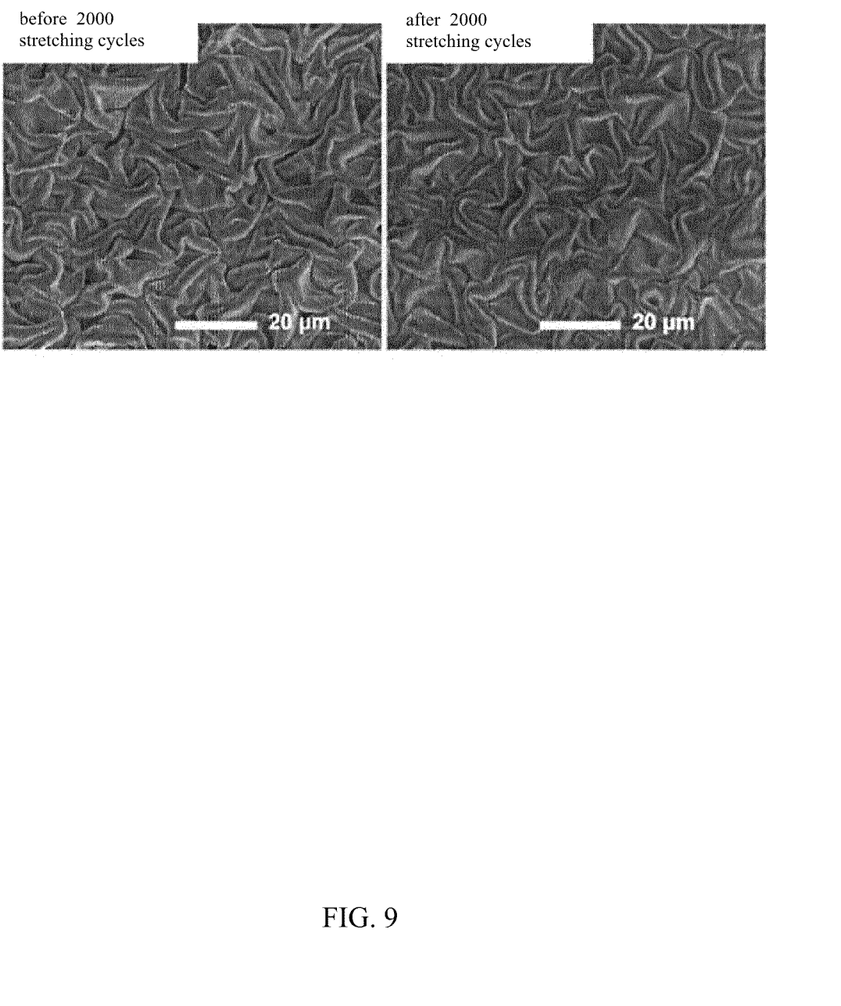
FIG. 9 is a scanning electron microscope image of the stretchable film structure in FIG. 5 along an X-axis direction before and after 2000 stretching cycles.

The first direction is defined as an X-axis, and the second direction is defined as a Y-axis. Referring to FIG. 8, the stretchable film structure performs 0-150 stress cyclically, it can be seen that after the stretchable film structure is stretched 2000 times of 0~150% stress in different directions; the axial resistance increase of the stretchable film structure is less than 6%. It shows that the stretchable film structure has excellent resistance to repeated stretching in different directions. FIG. 9 shows a scanning electron microscope image of the stretchable film structure along an X-axis direction. It can be seen from FIG. 9 that the surface morphology of the stretchable film structure is similar before and after 2000 stretching cycles, and the plurality of wrinkles has almost no change.

Figure 10:
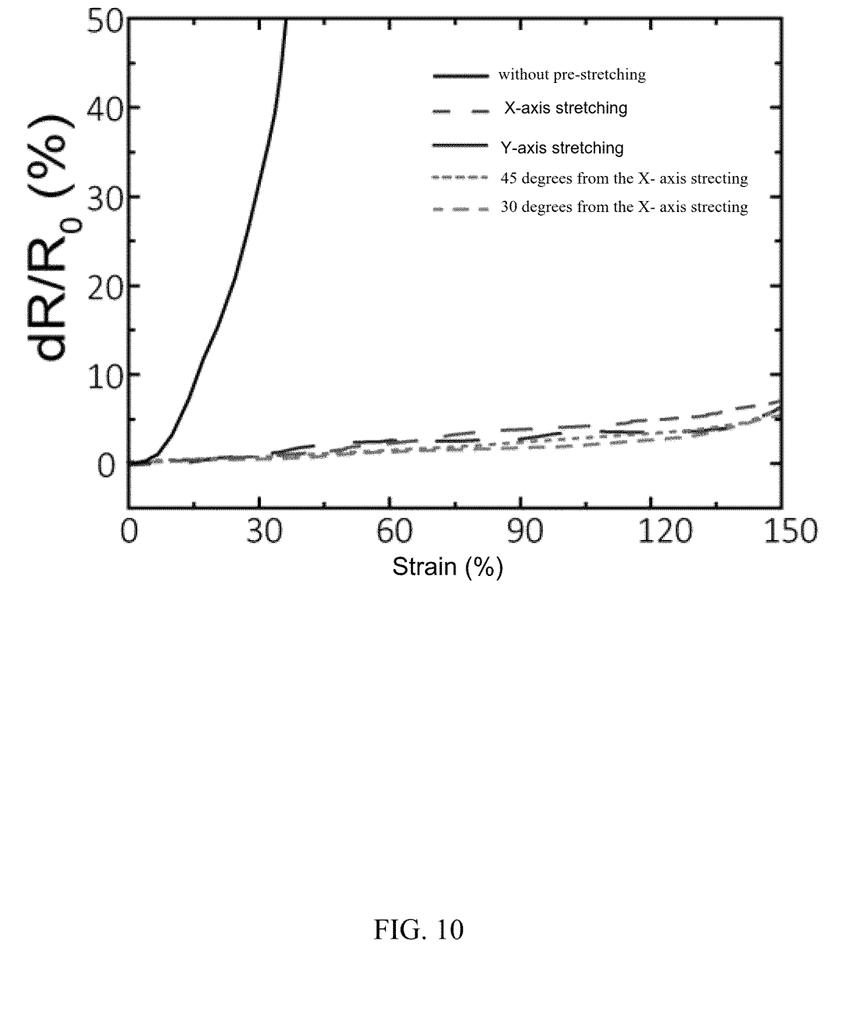
FIG. 10 is a diagram a resistance of the stretchable film structure in FIG. 5 vs strain at different stretching directions.

Referring to FIG. 10, in one embodiment, an extending direction of the carbon nanotubes of the carbon nanotube film structure is parallel to the X-axis or the Y-axis. FIG. 10 shows that compared with the film structure without pre-stretching, the stability of the tensile resistance of the stretchable film structure is greatly improved. FIG. 10 further shows that when the stretching direction is 45 degrees or 30 degrees from the X axis, the stretchable film structure exhibits better resistance stability than stretching along the X or Y axis; which indicated that when an angle between the stretching direction and the extending direction of the carbon nanotubes of the carbon nanotube film structure is not equal to zero, the carbon nanotubes of the carbon nanotube film structure are not easily broken during stretching, and a shape of the carbon nanotube film structure is more stable.

In some embodiments, when the stretchable film structure is applied, an angle is formed between the stretching direction and the extending direction of the carbon nanotubes of the stretchable film structure. In one embodiment, when the stretchable film structure is applied, the angle formed between the stretching direction and the extending direction of the carbon nanotubes of the stretchable film structure is larger than or equal to 30 degrees and less than or equal to 60 degrees. When the angle between the extending direction of the carbon nanotubes of the carbon nanotube film structure and the stretching direction is formed, the carbon nanotube film structure can absorb the stress by its own deformation, and thus the carbon nanotube film structure is not easy to be pulled broken, and an increasing rate of resistance is slowed down.

The elastic substrate 120 can be optional. In one embodiment, the stretchable film structure does not have the elastic substrate 120, just comprises the carbon nanotube film structure 140.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method of making a stretchable film structure comprising:
   step (S1): providing an elastic substrate, and pre-stretching the elastic substrate along a first direction and a second direction intersecting with the first direction, to obtain a pre-stretched elastic substrate;
   step (S2): laying a carbon nanotube film structure on a surface of the pre-stretched elastic substrate, and the carbon nanotube film structure comprising a plurality of super-aligned carbon nanotube films stacked with each other, each of the plurality of super-aligned carbon nanotube films comprising a plurality of carbon nanotubes substantially parallel with each other;
   step (S3): releasing the pre-stretching of the elastic substrate to restore deformations of the elastic substrate, and forming a plurality of wrinkles on a surface of the carbon nanotube film structure, wherein the plurality of wrinkles are able to unfold simultaneously in multiple different stress directions; and
   step (S4): removing the elastic substrate after step (S3).

2. The method of claim 1, wherein the first direction is perpendicular with the second direction.

3. The method of claim 1, wherein the elastic substrate is biaxial pre-stretched along each of the first direction the second direction.

4. The method of claim 3, wherein a shape of the elastic substrate is a rectangle, the elastic substrate is biaxial pre-stretched both along the first direction and the second direction, the first direction is parallel with a long side of the rectangle, and the second direction is parallel with a short side of the rectangle.

5. The method of claim 1, wherein the elastic substrate is uniaxial pre-stretched along the first direction and the second direction.

6. The method of claim 1, wherein in step (S1) the elastic substrate is pre-stretched to a same amount of strain in the first direction and in the second direction.

7. The method of claim 6, wherein the elastic substrate is pre-stretched to 150% strain in both the first and the second directions.

8. The method of claim 1, wherein the plurality of carbon nanotubes are differently aligned between adjacent two of the super-aligned carbon nanotube films to form a grid structure, and alignment directions of the plurality of carbon nanotubes between adjacent two of the super-aligned carbon nanotube films intersect with each other/are different.

9. The method of claim 8, wherein a angle of an angle of the alignment directions of the plurality of carbon nanotubes between adjacent two of the super-aligned carbon nanotube films is about 90 degrees.

10. The method of claim 1, wherein each of the plurality of super-aligned carbon nanotube films is drawn from a super-aligned carbon nanotube array.

11. The method of claim 1, wherein a method of laying the carbon nanotube film structure on the surface of the pre-stretched elastic substrate comprises: step (I), drawing a first carbon nanotube film from a carbon nanotube array and laying the first carbon nanotube film on the surface of the pre-stretched elastic substrate; step (II), drawing a second carbon nanotube film from the carbon nanotube array and laying the second carbon nanotube film on a surface of the first carbon nanotube film, to make the second carbon nanotube film stack with the first carbon nanotube film; and step (III), repeating step (III) to obtain the carbon nanotube film structure.

12. The method of claim 1, wherein an extending direction of the carbon nanotubes of the carbon nanotube film structure is parallel with the first direction or the second direction.

13. The method of claim 1, wherein after step (S2) and before step (S3), an organic solvent is applied on the carbon nanotube film structure to soak the carbon nanotube film structure.

14. The method of claim 1, wherein the plurality of wrinkles is formed by a plurality of carbon nanotubes of the carbon nanotube film structure bending along a direction substantially perpendicular to the surface of the elastic substrate.

15. The method of claim 1, wherein a material of the elastic substrate is silicone rubber, polyvinyl chloride, polytetrafluoroethylene, polyurethane, polyvinyl chloride, or poly dimethylsiloxane.

16. A stretchable film structure consisting of a plurality of super-aligned carbon nanotube films stacked with each other, wherein each of the plurality of super-aligned carbon nanotube films consists of a plurality of carbon nanotubes joined end to end by van der Waals forces and parallel with each other; a surface of the plurality of super-aligned carbon nanotube films comprises a plurality of wrinkles, and the plurality of wrinkles are able to unfold simultaneously in multiple different stress directions.

* * * * *